United States Patent
Chon et al.

(10) Patent No.: US 10,498,276 B1
(45) Date of Patent: Dec. 3, 2019

(54) APPARATUS FOR CONTROLLING MOTOR OF VEHICLE

(71) Applicants: HYUNDAI MOTOR COMPANY, Seoul (KR); KIA MOTORS CORPORATION, Seoul (KR)

(72) Inventors: Chae Duck Chon, Hwaseong-si (KR); Heon Young Kwak, Hwaseong-si (KR); Ho Joon Shin, Suwon-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 16/180,603

(22) Filed: Nov. 5, 2018

(30) Foreign Application Priority Data

Jul. 4, 2018 (KR) ........................ 10-2018-0077752

(51) Int. Cl.
| | |
|---|---|
| *H02P 21/18* | (2016.01) |
| *H02P 21/00* | (2016.01) |
| *H02P 27/06* | (2006.01) |
| *H02P 21/22* | (2016.01) |
| *H02P 21/24* | (2016.01) |

(52) U.S. Cl.
CPC .......... *H02P 21/18* (2016.02); *H02P 21/0017* (2013.01); *H02P 21/22* (2016.02); *H02P 21/24* (2016.02); *H02P 27/06* (2013.01)

(58) Field of Classification Search
CPC ...... H02P 1/00; H02P 1/04; H02P 1/24; H02P 1/46; H02P 3/00; H02P 3/18; H02P 21/00; H02P 23/00; H02P 27/00; H02P 27/04; H02P 27/06; H02P 6/00; H02P 6/18

USPC ..... 318/400.01, 400.02, 700, 701, 721, 727, 318/400.32, 400.33, 599, 811

See application file for complete search history.

(56) References Cited

U.S. PATENT DOCUMENTS

| | | | | |
|---|---|---|---|---|
| 7,443,130 | B2* | 10/2008 | Takao ...................... | H02P 21/14 318/720 |
| 7,999,496 | B2* | 8/2011 | Gleason ................. | B60K 6/365 318/139 |
| 8,674,368 | B2* | 3/2014 | Takahashi ............ | G09G 3/3233 257/72 |
| 9,154,065 | B2* | 10/2015 | Yamazaki ............... | H02P 6/183 |
| 2004/0070360 | A1* | 4/2004 | E. Schulz ............. | B60L 15/025 318/700 |

(Continued)

FOREIGN PATENT DOCUMENTS

KR 10-2014-0120649 A 10/2014

*Primary Examiner* — Antony M Paul
(74) *Attorney, Agent, or Firm* — Morgan, Lewis & Bockius LLP (57) ABSTRACT

An apparatus for controlling a motor of a vehicle includes: a current controller generating a voltage instruction for driving the motor; a signal generator generating a magnetic pole discrimination reference signal that is combined with the voltage instruction; an inverter driving the motor on the basis of a corrected voltage instruction obtained by comparing the voltage instruction and the magnetic pole discrimination reference signal; and a processor including a control logic for deriving a response component to the magnetic pole discrimination reference signal from a driving current transferred to the motor from the inverter, and for determining a polarity of the rotor of the motor on the basis of the response component.

13 Claims, 8 Drawing Sheets

(56) References Cited

U.S. PATENT DOCUMENTS

| | | | |
|---|---|---|---|
| 2010/0301790 A1* | 12/2010 | Liu | H02P 6/18 318/400.33 |
| 2014/0327379 A1* | 11/2014 | Yang | H02P 6/18 318/400.02 |

* cited by examiner

APPARATUS FOR CONTROLLING MOTOR OF VEHICLE

CROSS REFERENCE TO RELATED APPLICATION

The present application claims priority to Korean Patent Application No. 10-2018-0077752, filed Jul. 4, 2018, the entire contents of which is incorporated herein for all purposes by this reference.

TECHNICAL FIELD

The present disclosure relates to an apparatus for controlling a motor of a vehicle, and more particularly, to an apparatus for controlling a motor of a vehicle through senseless control.

BACKGROUND

A motor generates power for driving in eco-friendly vehicles such as an electric vehicle (EV) and a plug-in hybrid vehicle (PHEV). Such a motor is connected to an inverter and generates torque using a 3-phase current from the inverter. The inverter controls the 3-phase current to control motor torque, and generally, the 3-phase current and the position information of the rotor of the motor are obtained for current control by a sensor.

The position sensor for the rotor of the motor is disposed in the motor and is connected to the inverter through an external signal wiring. When a wiring connector is not normally fastened or a motor current is abnormally controlled due to distortion of rotor position information by disconnection or a short circuit, so undesired driving force may be generated. Accordingly, it is generally possible to stop inverter current control when there is a problem, using an error logic for a rotor position sensor, but when a problem occurs during driving, a driver cannot control the vehicle as he/she intends, so safety of the driver is not secured.

That is, according to the related art, an inverter stops motor current control when a problem of a rotor position sensor of a motor is sensed, so that power supply is stopped in an EV without a separate power source, so the vehicle has to be stopped. Therefore, when the problem described above occurs while a vehicle is driven, a driver cannot control the vehicle as intended, and therefore safety of the driver is not secured.

SUMMARY

The present disclosure has been made in an effort to solve the problems and an object of the present disclosure is to provide an apparatus for controlling a motor of a vehicle, the apparatus being able to control a motor by estimating the position of a rotor through a senseless algorithm with a position sensor that senses the position of the rotor of the motor.

In order to achieve the objects of the present disclosure, an apparatus for controlling a motor of a vehicle according to an exemplary embodiment of the present disclosure includes: a current controller generating a voltage instruction for driving the motor; a signal generator generating a magnetic pole discrimination reference signal that is combined with the voltage instruction; an inverter driving the motor on the basis of a corrected voltage instruction obtained by comparing the voltage instruction and the magnetic pole discrimination reference signal; and a processor including a control logic deriving a response component to the magnetic pole discrimination reference signal from a driving current transferred to the motor from the inverter, the processor determining a polarity of a rotor of the motor based on the response component.

The current controller may receive synchronous-coordinate d-axial and q-axial actual current values that are applied to the motor and synchronous-coordinate d-axial and q-axial current instruction values for driving the motor and may output synchronous-coordinate d-axial and q-axial voltage instructions for driving the motor.

The signal generator may generate and apply a high-frequency voltage signal to the synchronous-coordinate d-axial and q-axial voltage instructions that are output from the current controller.

The apparatus may further include at least one or more of: a first phase converter converts synchronous-coordinate d-axial and q-axial voltages corrected by being combined with a high-frequency voltage signal from the signal generator into stationary-coordinate d-axial and q-axial voltages; a current sensor measuring driving currents that are provided for phases of the motor using output voltage of the inverter; and a second phase converter converting the driving currents that are provided for the phases of the motor measured by the current sensor into synchronous-coordinate and stationary-coordinate d-axial and q-axial currents.

The rotor position estimator may include: a first filter removing a high-frequency component of synchronous-coordinate d-axial current converted by the second phase converter; a second filter removing a high-frequency component of synchronous-coordinate q-axial current converted by the second phase converter; and a first position estimator estimating a position of the rotor on the basis of synchronous-coordinate q-axial current information with a high-frequency component removed by the second filter and magnetic pole component information of the rotor determined by the magnetic pole determiner.

The rotor position estimator may be stored with inductance information corresponding to a position of the rotor.

The rotor position estimator may determine that the rotor is positioned in a predetermined impossible magnetic pole determination range when the magnetic pole determiner cannot determine the magnetic pole of the rotor, and the signal generator may generate and apply a magnetic pole discrimination reference signal changed as much as a predetermined level when the rotor position estimator determines that the rotor is positioned in the impossible magnetic pole determination range.

The magnetic pole determiner may determine the magnetic pole of the rotor by deriving a slope between first inductance and second inductance and a slope between the first inductance and third inductance and comparing the slopes on the basis of first inductance information corresponding to the position of the rotor when it is determined that the rotor is positioned in the impossible magnetic pole determination range, and second inductance information and third inductance information corresponding to a first estimation position and a second estimation position where the rotor is to be positioned when the changed magnetic pole discrimination reference signal is received from the signal generator.

The magnetic pole determiner may determine a magnetic pole where the estimation position of the rotor where a larger one of the slopes is derived is positioned as the magnetic pole of the rotor.

The rotor position estimator may further include a second position estimator driving an expanded induced voltage value on the basis of stationary-coordinate d-axial and q-axial current values converted by the second phase converter, and estimating the position of the rotor on the basis of the derived expanded induced voltage value.

The second position estimator may estimate the position of the rotor through an EEMF (Extended Electromotive Force)-based algorithm.

The position information of the rotor derived through the EEMF-based algorithm may include magnetic pole information of the rotor.

The first position estimator may estimate the position of the rotor on the basis of the magnetic information of the rotor estimated by the second position estimator and the synchronous-coordinate q-axial current information with a high-frequency component removed by the second filter.

According to the apparatus for controlling a motor of a vehicle according to the present disclosure, it is possible to control a motor on the basis of position information of a rotor derived through a sensorless algorithm without a position sensor that senses the position of the rotor of the motor.

When it is determined that the rotor is positioned in an impossible magnetic pole determination range, the signal generator generates and applies a magnetic pole discrimination reference signal changed as much as a predetermined level, a slope between first inductance and second inductance and a slope between the first inductance and third inductance are derived on the basis of first inductance information corresponding to the position of the rotor in the impossible magnetic pole determination range and second inductance information and third inductance information corresponding to a first estimation position and a second estimation position where the rotor is to be positioned when the changed magnetic pole discrimination reference signal is received, and the slopes are compared, thereby determining the magnetic pole of the rotor. Accordingly, it is possible more accurately determine the magnetic pole of the rotor in a wider range.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

Hereinafter, an apparatus for controlling a motor of a vehicle according to various embodiments of the present disclosure is described with reference to the accompanying drawings.

Figure 1:
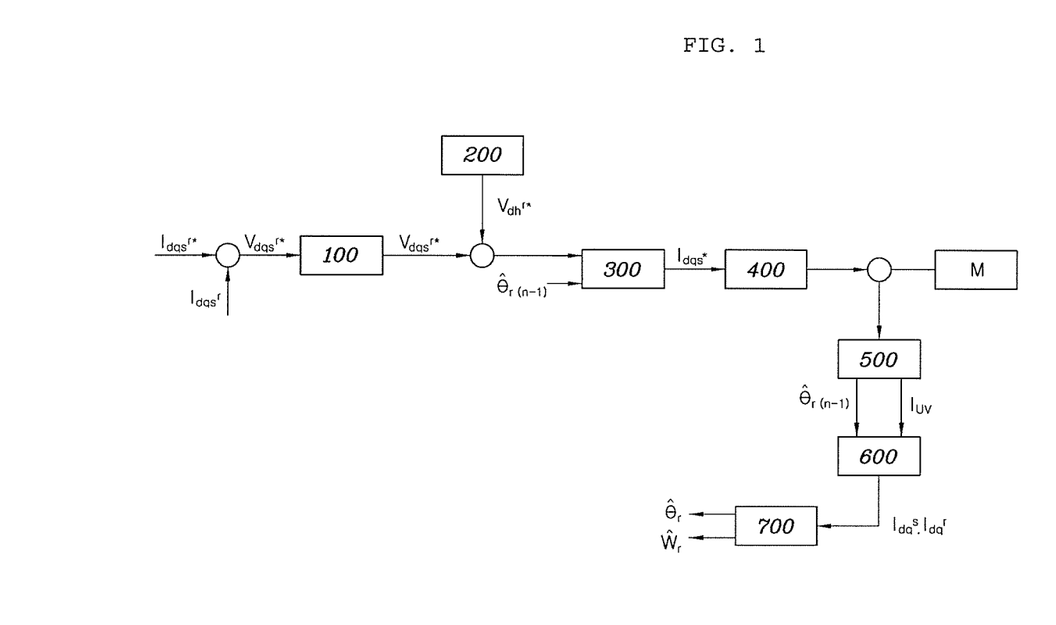
FIG. 1 is a diagram showing the entire configuration of an apparatus for controlling a motor of a vehicle according to an embodiment of the present disclosure.
Figure 2:
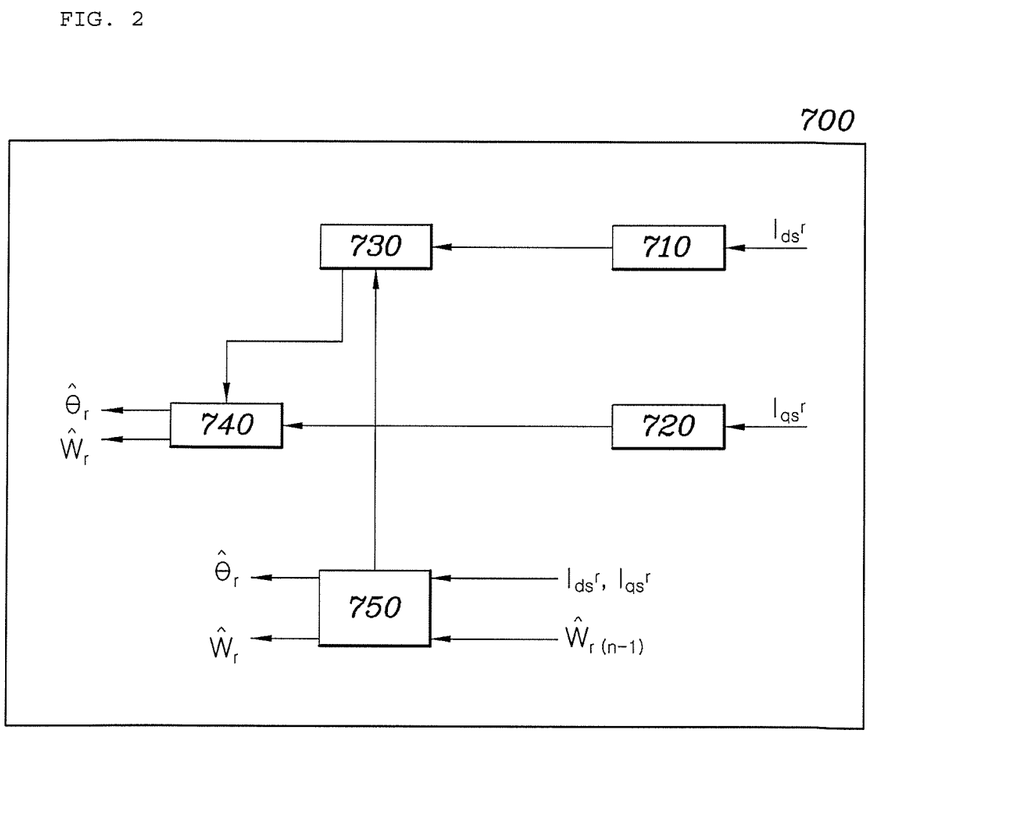
FIG. 2 is a diagram showing the detailed configuration of the apparatus for controlling a motor of a vehicle according to an embodiment of the present disclosure.
Figure 3A:
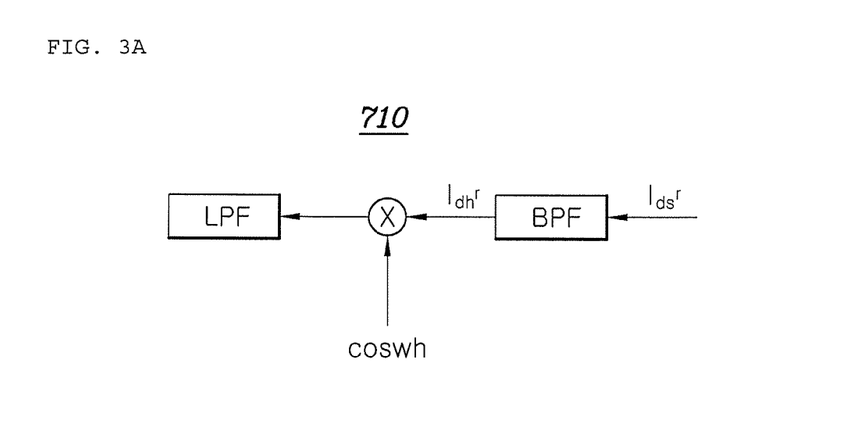
FIGS. 3A and 3B are diagrams showing the detailed configuration of a first filter and a second filter, respectively, in the apparatus for controlling a motor of a vehicle according to an embodiment of the present disclosure.
Figure 3B:
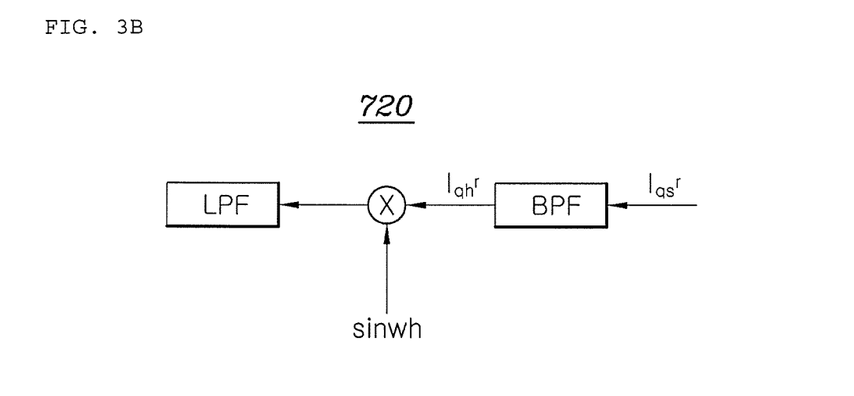
Figure 4:
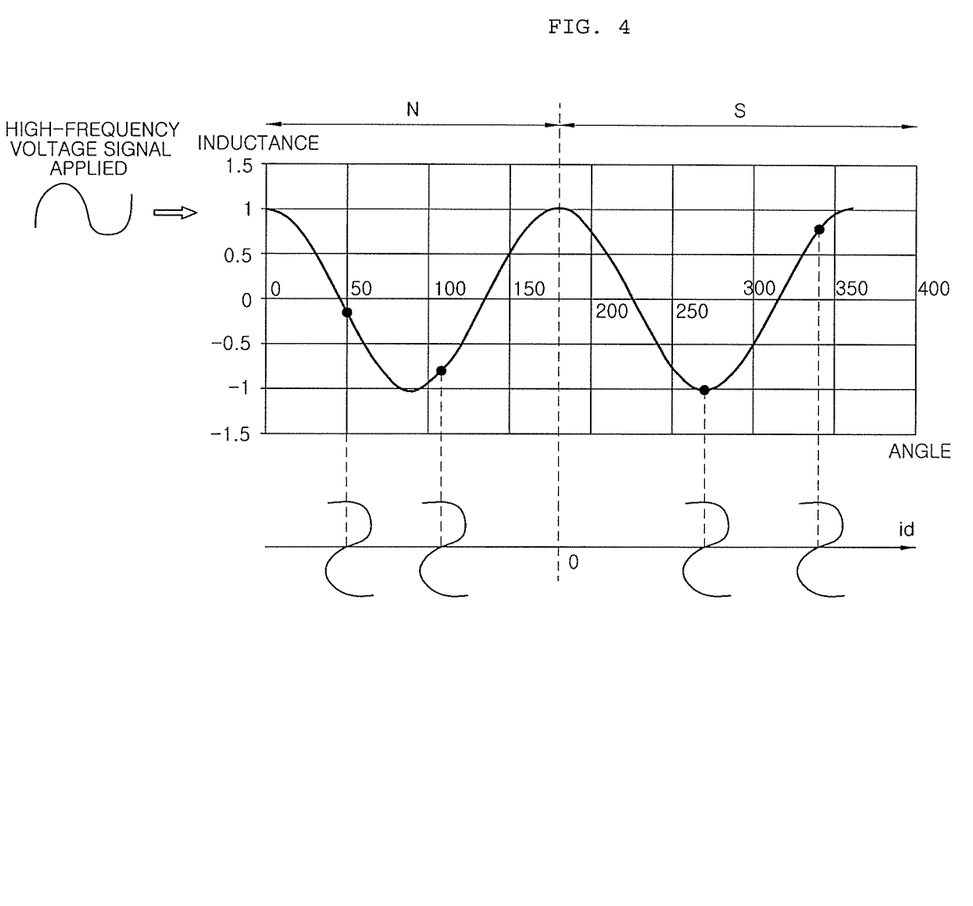
FIG. 4 is a diagram showing the case in which the polarity of a current is changed by the direction of the magnetic pole of a rotor when a signal generator applies a magnetic pole discrimination reference signal in the apparatus for controlling a motor of a vehicle according to an embodiment of the present disclosure.
Figure 5:
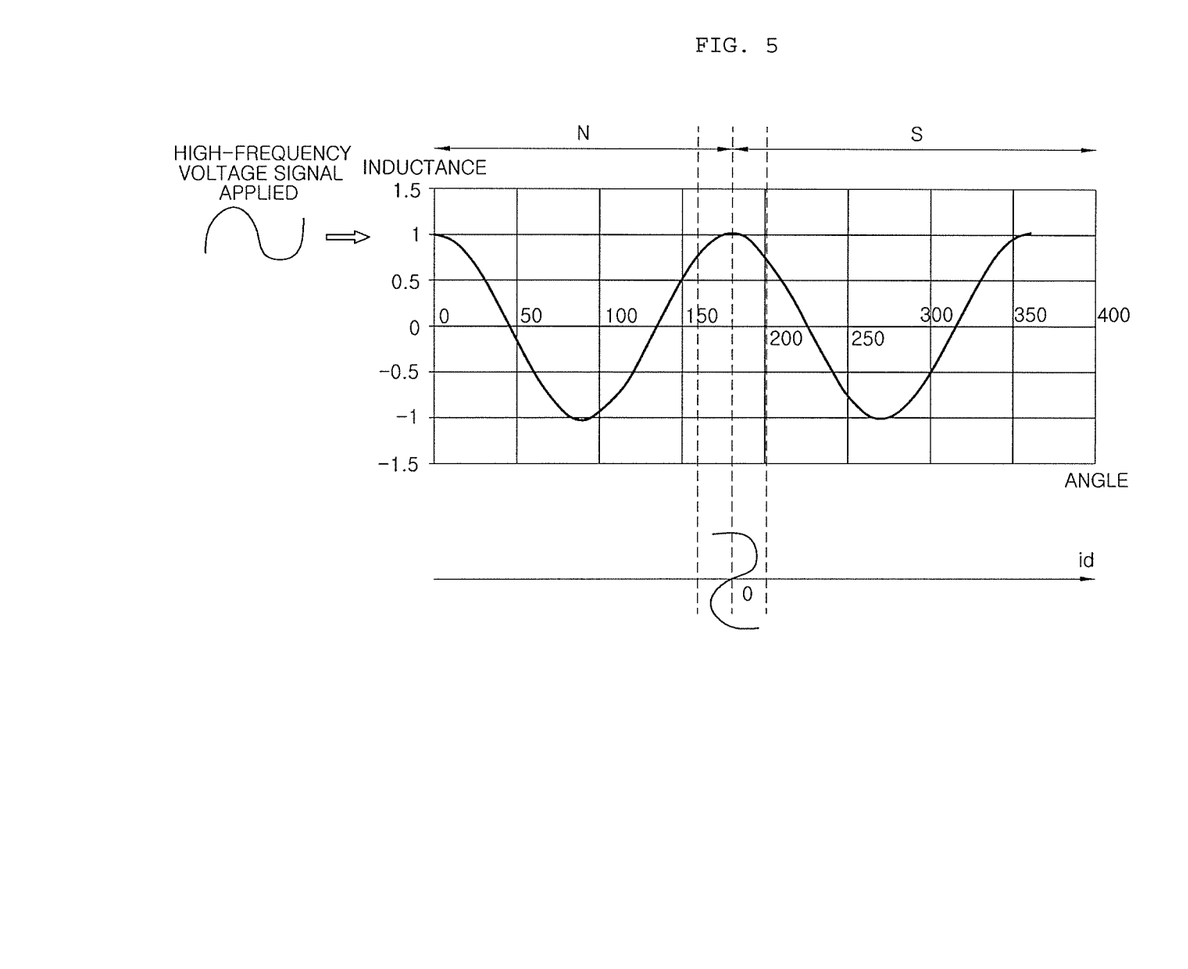
FIG. 5 is diagram showing the case in which a positive pole and a negative pole of a current simultaneously appear when a signal generator applies a magnetic pole discrimination reference signal in the apparatus for controlling a motor of a vehicle according to an embodiment of the present disclosure.
Figure 6:
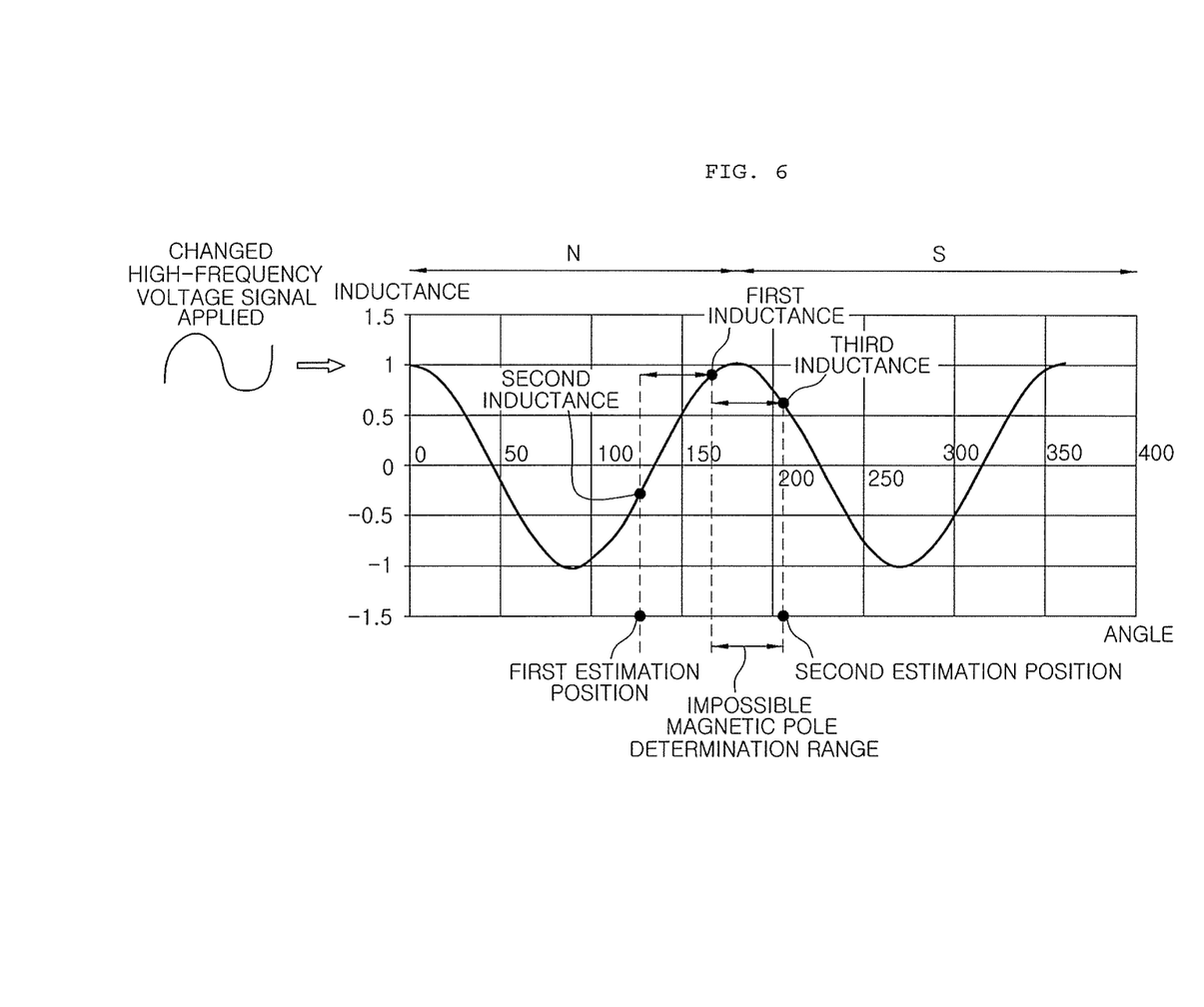
FIG. 6 is a diagram showing first inductance information when a rotor is positioned in a impossible magnetic pole discrimination range, and second inductance information and third inductance information corresponding to a first estimation position and a second estimation position that the rotor is to be positioned when a signal generator applies a changed magnetic pole discrimination reference signal in the apparatus for controlling a motor of a vehicle according to an embodiment of the present disclosure.
Figure 7:
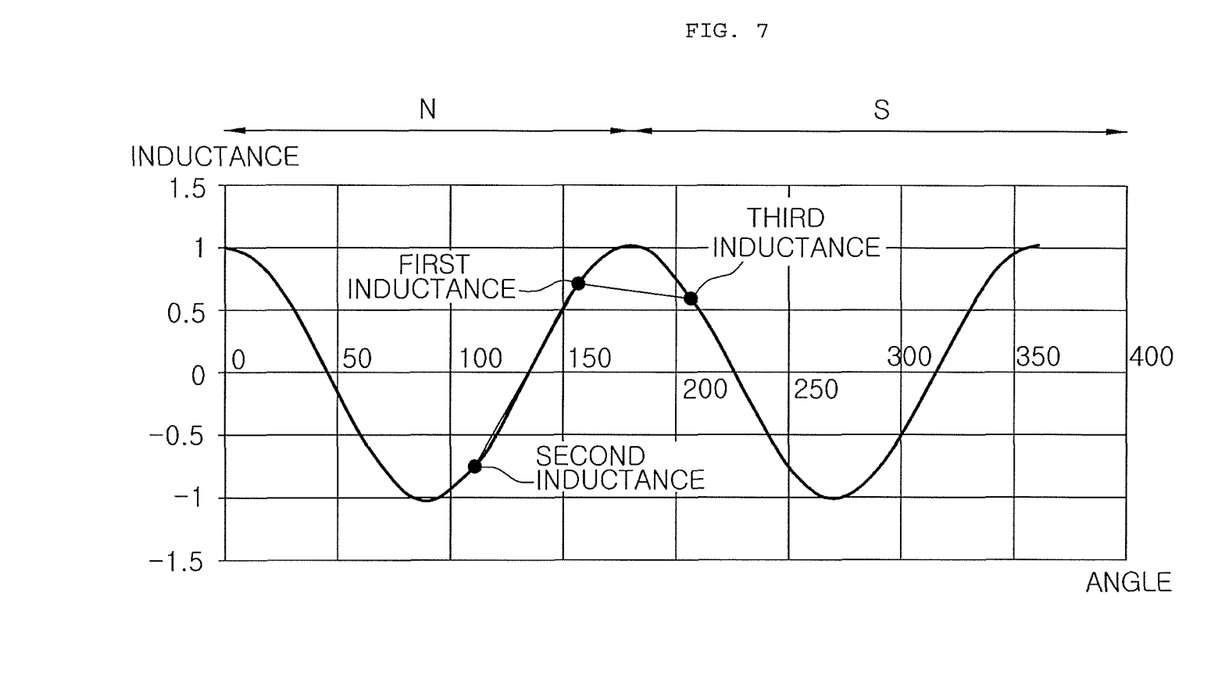
FIG. 7 is a diagram comparing a slope between the first inductance and second inductance and a slope between the first inductance and third inductance in the apparatus for controlling a motor of a vehicle according to an embodiment of the present disclosure.

FIG. 1 is a diagram showing the entire configuration of an apparatus for controlling a motor of a vehicle according to an embodiment of the present disclosure, FIG. is a diagram showing the detailed configuration of a position estimator, FIGS. 3A and 3B are diagrams showing the detailed configuration of a first filter and a second filter, respectively, FIG. 4 is a diagram showing the case in which the polarity of a current is changed by the direction of the magnetic pole of a rotor when a signal generator applies a magnetic pole discrimination reference signal, FIG. 5 is diagram showing the case in which a positive pole and a negative pole of a current simultaneously appear when a signal generator applies a magnetic pole discrimination reference signal, FIG. 6 is a diagram showing first inductance information when a rotor is positioned in a impossible magnetic pole discrimination range, and second inductance information and third inductance information corresponding to a first estimation position and a second estimation position that the rotor is to be positioned when a signal generator applies a changed magnetic pole discrimination reference signal, and FIG. 7 is a diagram comparing a slope between the first inductance and second inductance and a slope between the first inductance and third inductance.

As shown in FIG. 1, an apparatus for controlling a motor of a vehicle according to an embodiment of the present disclosure may include a current controller 100, a signal generator 200, an inverter 400, and a rotor position estimator 700 and may further include a first phase converter 300, a current sensor 500, and a second phase converter 600. Hereafter, the detailed configuration of the apparatus for controlling a motor of a vehicle according to the present disclosure is described in detail.

In the present disclosure, the apparatus for controlling a motor of a vehicle maybe a control system managing, commanding, or regulating the behavior of devices or systems using control loops. Here, a feedback controller may be used to automatically control a process or operation.

In the present disclosure, the current controller 100 may be a processor for operating and controlling by a predetermined program, the signal generator 200 may be an electronic device that generates repeating or non-repeating electronic signals in either the analog or the digital domain, the first and second phase converters 300 and 600 may be a device that converts electric power provided as single phase to multiple phase or vice versa, the inverter 400 may be an electronic device or circuitry that changes direct current (DC) to alternating current (AC), the current sensor 500 may be a device detecting electric current, and the rotor position estimator 700 may be implemented as a processor such as central processing unit (CPU) in an electronic circuitry within a computer that carries out instructions of a computer program by performing arithmetic, logical, control, and input/output (I/O) operations specified by the instructions.

The current controller 100 generates a voltage instruction for driving a motor M. In detail, as shown in FIG. 1, the current controller 100 can receive synchronous-coordinate d-axial and q-axial current values that are applied to the motor M and synchronous-coordinate d-axial and q-axial current instruction values for driving the motor M and can output synchronous-coordinate d-axial and q-axial voltage instructions for driving the motor M. According to an embodiment, the current controller 100 may include a proportional integral (PI) controller and a feed-forward compensator to control the synchronous-coordinate d-axial and q-axial currents. The PI controller and the feed-forward compensator are well known in the art, so they are not described in detail herein.

The signal generator 200 generates a magnetic pole discrimination reference signal that is combined with a voltage instruction that is output from the current controller 100. In detail, as shown in FIG. 1, the signal generator 200 can generate and apply a magnetic pole discrimination reference signal to be combined with a voltage instruction that is output from the current controller 100. The magnetic pole discrimination reference signal that is generated by the signal generator 200 may be a high-frequency voltage signal. That is, the signal generator 200 can make a high-frequency voltage signal be combined with synchronous-coordinate d-axial and q-axial voltage instructions by generating and applying a high-frequency voltage signal to the synchronous-coordinate d-axial and q-axial voltage instructions.

The first phase converter 300 converts the synchronous-coordinate d-axial and q-axial voltage instructions corrected by being combined with a high-frequency voltage signal from the signal generator 200 into stationary-coordinate d-axial and q-axial voltage instructions. Converting the synchronous-coordinate d-axial and q-axial voltages into stationary-coordinate d-axial and q-axial voltages is well known in the art, so it is not described in detail herein.

The inverter 400 can drive the motor M on the basis of a corrected voltage instruction obtained by comparing the magnetic pole discrimination reference signal with the voltage instruction output from the current controller 100. In detail, the inverter 400 can drive the motor M by receiving the synchronous-coordinate d-axial and q-axial voltage instructions converted by the first phase converter 300 and by providing voltage to phases of the motor M on the basis of corresponding voltage instructions.

The current sensor 500 measures driving currents that are provided for the phases of the motor M using the voltage that is output from the inverter 400.

The second phase converter 600 converts the driving currents that are provided for the phases of the motor M measured by the current sensor 500 into synchronous-coordinate and stationary-coordinate d-axial and q-axial currents. Assuming that the motor M has three phases in the present disclosure, converting currents that are provided for the three phases of the motor M into synchronous-coordinate and stationary-coordinate d-axial and q-axial currents is well known in the art, so it is not described in detail herein.

The rotor position estimator 700 can estimate the position of a rotor on the basis of the synchronous-coordinate and stationary-coordinate d-axial and q-axial current values converted by the second phase converter. In detail, the rotor position estimator 700 may include control logics, for example, as shown in FIG. 2, a first filter 710, a second filter 720, a magnetic pole determiner 730, and a first position, estimator 740, and depending on embodiments, it may further include a second position estimator 750.

In detail, the first filter 710 removes a high-frequency component of the synchronous-coordinate d-axial current converted by the second phase converter 600. In detail, referring to FIGS. 3A and 3B, the first filter 710 may include a low-pass filter (LPF) and a band-pass filter (BPF). In other words, the first filter 710 can primarily remove the high-frequency component of the synchronous-coordinate d-axial current converted by the second phase converter 600 through the band-pass filter and secondarily remove the high-frequency component of the synchronous-coordinate d-axial current through the low-pass filter. It is possible to remove a high-frequency component that is applied from the signal generator 200 by applying a waveform that an inverse to a high-frequency voltage signal that is applied from the signal generator 200, between the band-pass filter and the low-pass filter. For example, when a high-frequency voltage signal having a sine waveform is applied from the signal generator 200, as shown in FIGS. 3A and 3B, it is possible to remove a high-frequency component of a d-axial current compared with the high-frequency voltage signal having a sine waveform by applying a high-frequency voltage signal having cosine waveform that is an inverse to the sine waveform to an output signal from the band-pass filter.

On the other hand, the second filter 720 removes a high-frequency component of the synchronous-coordinate q-axial current converted by the second phase converter 600. In detail, referring to FIGS. 3A and 3B, the second filter 720 may include a low-pass filter (LPF) and a band-pass filter (BPF). In other words, the second filter 720 can primarily remove the high-frequency component of the synchronous-coordinate d-axial current converted by the second phase converter 600 through the band-pass filter and secondarily remove the high-frequency component of the synchronous-coordinate d-axial current through the low-pass filter. As described above with the first filter 710, it is possible to remove a high-frequency component that is applied from the signal generator 200 by applying a waveform that an inverse to a high-frequency voltage signal that is applied from the signal generator 200, between the band-pass filter and the low-pass filter.

The magnetic pole determiner 730 can derive a response component to a magnetic pole discrimination reference signal from a driving current that is provided to the motor M from the inverter 400 and can determine the polarity of the rotor of the motor M on the basis of the response component. The response component to the magnetic pole discrimination reference signal may be the polarity of the synchronous-coordinate d-axial current that is output through the first filter 710 and the magnetic pole determiner 730 can determine the magnetic pole of the rotor of the motor M on the basis of the polarity of the synchronous-coordinate d-axial current.

In more detail, referring to FIG. 4, when the signal generator 200 applies a magnetic pole discrimination reference signal, that is, a high-frequency voltage signal, the polarity of an output current may depend on the direction of the polarity of the rotor. For example, when the signal generator 200 applies a high-frequency voltage signal and the rotor of a motor M has an N-polarity, the polarity of the synchronous-coordinate d-axial current that is output through the first filter 710 may be negative. Further, when the signal generator 200 applies a high-frequency voltage signal and the rotor of a motor M has an S-polarity, the polarity of the synchronous-coordinate d-axial current that is output through the first filter 710 may be positive. As described above, the magnetic pole determiner 730 can determine the polarity of the rotor of a motor M on the basis of the polarity of the synchronous-coordinate d-axial current that is output through the first filter 710.

FIG. 5 is diagram showing the case in which a positive pole and a negative pole of a current simultaneously appear when a signal generator applies a magnetic pole discrimination reference signal, The magnetic pole determiner 730, as shown in FIG. 4, can determine the magnetic pole of a rotor in accordance with the polarity of a synchronous-coordinate d-axial current that is output through the first filter 710, but as shown in FIG. 5, when the synchronous-coordinate d-axial current that is output through the first filter 710 shows both of a positive pole and a negative pole, it is impossible to determine the polarity of the rotor only from the polarity of the synchronous-coordinate d-axial current. A method of determining the magnetic pole of a rotor when a synchronous-coordinate d-axial current that is output through the first filter 710 shows both of a positive pole and a negative pole and it is impossible to determine the magnetic pole of a rotor only from the polarity of the synchronous-coordinate d-axial current is described hereafter.

When the magnetic pole determiner 730 cannot determine the magnetic pole of a rotor, as described with reference to FIG. 4, the rotor position estimator 700 can determine that the rotor is positioned in a predetermined impossible magnetic pole determination range. The rotor position estimator 700 may be stored with inductance information corresponding to the position of the rotor.

When the rotor position estimator 700 determines that the rotor is positioned in the impossible magnetic pole determination range, the signal generator 200 can generate and apply a magnetic pole discrimination reference signal changed as much as a predetermined level.

The magnetic pole determiner 730, as shown in FIG. 6, can determine the magnetic pole of the rotor by deriving the slope between first inductance and second inductance and the slope between first inductance and third inductance and comparing the slopes on the basis of first inductance information corresponding to the position of the rotor when it is determined that the rotor is positioned in the impossible magnetic pole determination range, and second inductance information and third inductance information corresponding to a first estimation position and a second estimation position where the rotor is to be positioned when the magnetic pole discrimination reference signal is changed as much as a predetermined level is received from the signal generator 200. The magnetic pole determiner 730 can determine the magnetic pole where the estimation position of the rotor where the larger one of the slopes is derived is positioned as the magnetic pole of the rotor. The distances from the position of the rotor positioned in the impossible magnetic pole determination range to the first estimation position and the second estimation position are the same.

For example, as shown in FIG. 7, when the slope between first inductance and second inductance and the slope between the first inductance and third inductance are derived and compared and the slope between the first inductance and the second inductance is larger, the magnetic pole determiner 730 can determine an N-pole where the first estimation position corresponding to the second inductance where the larger slope is derived is positioned as the magnetic pole of the rotor. If the slope between the first inductance and the third inductance is larger, the magnetic pole determiner 730 can determine that an S-pole where the second estimation position corresponding to the third inductance where the larger slope is derived is positioned as the magnetic pole of the rotor.

The first position estimator 740 can estimate the position of the rotor on the basis of synchronous-coordinate q-axial current information with a high-frequency component removed through the second filter 720 and the magnetic pole information of the rotor determined by the magnetic pole determiner 730.

Figure 8:
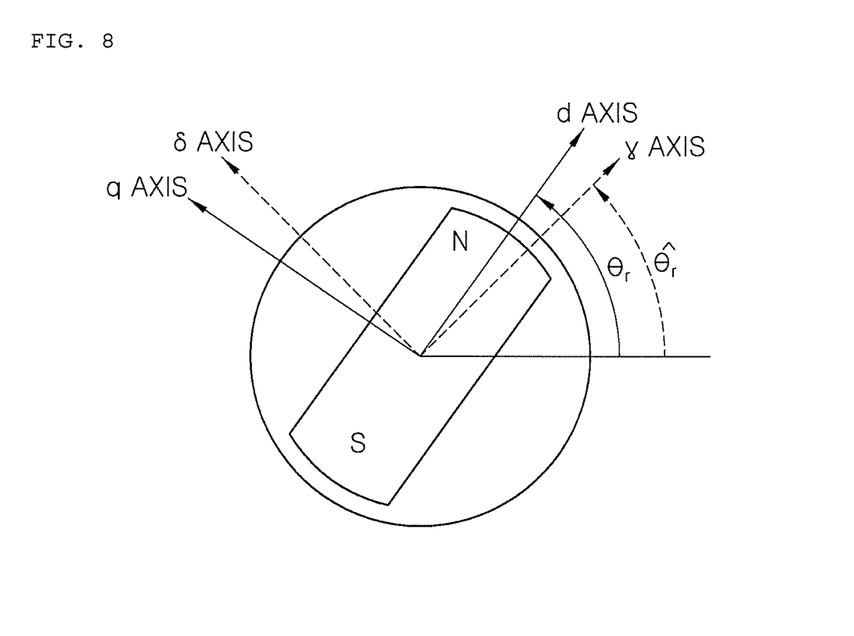
FIG. 8 is a diagram showing an actual synchronous coordinate axis and an estimation coordinate axis of the rotor of a motor in the apparatus for controlling a motor of a vehicle according to an embodiment of the present disclosure.

In more detail, the first position estimator 740 can derive error information of an actual axis and an estimated axis from the following Equation 1 on the basis of synchronous-coordinate q-axial current information converted by the second phase converter 600. Referring to FIG. 8, the actual axis may be d and q axes and the estimated axis may be ⋏ and δ axes.

$$\varepsilon_f = LPF\left(\frac{1}{2}\frac{V_{inj}}{\omega_h}\left(\frac{-\Delta L}{L_{ds}L_{qs}}\right)\sin 2\tilde{\theta} r \sin^2 \omega_h\right) \quad \text{[Equation 1]}$$

$$= \frac{1}{4}\frac{V_{inj}}{\omega_h}\left(\frac{-\Delta L}{L_{ds}L_{qs}}\right)\sin 2\tilde{\theta}_r$$

$$\approx \frac{1}{2}\frac{V_{inj}}{\omega_h}\left(\frac{-\Delta L}{L_{ds}L_{qs}}\right)(\theta_r - \hat{\theta}_r),$$

where $\varepsilon_f$ is error information, $V_{inj}$ is a magnitude component for voltage injection, $L_{qs}$ is q-axial impedance, $L_{ds}$ is d-axial impedance, $\tilde{\theta}$ is the difference between an estimated angle and a real angle of a rotor, $\theta_r$ is the real angle of the rotor, $\hat{\theta}_r$ is the estimated angle of the rotor, and $w_h$ is the velocity of the rotor.

The first position estimator 740 can derive an estimated angle of the rotor by inputting the error information derived from this method to a phase locked loop and can estimate the position of the rotor on the basis of the derived estimated angle of the rotor.

Furthermore, according to an embodiment, the first position estimator 740 can derive an estimated angle of the rotor in the method on the basis of magnetic pole information of the rotor estimated by the second position estimator 750, which will be described below, instead of the magnetic pole determiner 730, and synchronous-coordinate q-axial current information with a high-frequency component removed through the second filter 720, and can estimate the position of the rotor on the basis of the derived estimated angle of the rotor.

The second position estimator 750, as shown in FIG. 1, can derive expanded induced voltages ($e_{ds}{}^s e_{qs}{}^s$) of the d and q axes on the basis of stationary-coordinate d-axial and q-axial current values converted by the second phase converter 600, and can estimate the position of the rotor on the basis of the derived expanded induced voltages.

In detail, the second position estimator 750 in the present disclosure can estimate the position of a rotor through an EEMF (Extended Electromotive Force)-based sensorless algorithm. The position information of a rotor derived through the EEMF-based algorithm may include magnetic pole information of the rotor.

In more detail, the second position estimator 750 can derive an estimated angle of a rotor through the EEMF-based sensorless algorithm. The second position estimator 750 can drive expanded induced voltages ($e_{ds}^s e_{qs}^s$) on the basis of the following Equation 2, can drive a first estimated angle of a rotor through Equation 2 on the basis of the derived expanded induced voltage values, can derive an estimated angle of the rotor by inputting the derived first estimated angle to a phase locked loop, and can estimate the position of the rotor on the basis of the derived estimated angle.

$$\begin{bmatrix} e_{ds}^s \\ e_{qs}^s \end{bmatrix} = \begin{bmatrix} R_s + pL_{ds} & -\omega_r L_{qs} \\ \omega_r L_{qs} & R_s + pL_{ds} \end{bmatrix} \begin{bmatrix} i_{ds}^s \\ i_{qs}^s \end{bmatrix} +$$
$$\{(L_{ds} - L_{qs})(\omega_r i_{ds}^r - p i_{qs}^r) + \omega_r \lambda_{pm}\} \begin{bmatrix} -\sin\theta_r \\ \cos\theta_r \end{bmatrix}$$
[Equation 2]

where $e_{ds}^s$ is d-axial expanded induced voltage, $e_{qs}^s$ is q-axial expanded induced voltage, $L_{qs}$ is q-axial inductance, $L_{ds}$ is d-axial inductance, $\theta_r$ is a real angle of a rotor, $pL_{ds}$ is a differential value of the d-axial inductance, $i_{ds}^r$ is stationary-coordinate d-axial current, $i_{qs}^r$ is stationary-coordinate d-axial current, $w_r \lambda_{pm}$ is counter electromotive force, Rs is a phase resistance value, and Wr is a motor speed.

$$\theta_r' = \tan^{-1}\left(\frac{e_{ds}^s}{e_{qs}^s}\right)$$
[Equation 3]

where $\dot{\theta}_r$ is a first estimated angle, $e_{ds}^s$ is a d-axial expanded induced voltage, and $e_{qs}^s$: is a q-axial expanded induced voltage.

According to the apparatus for controlling a motor of a vehicle according to the present disclosure, it is possible to control a motor on the basis of position information of a rotor derived through a sensorless algorithm without a position sensor that senses the position of the rotor of the motor, and further, it is possible more accurately determine the magnetic pole of the rotor in a wider range.

What is claimed is:

1. An apparatus for controlling a motor of a vehicle, the apparatus comprising:
   a current controller generating a voltage instruction for driving the motor;
   a signal generator generating a magnetic pole discrimination reference signal that is combined with the voltage instruction;
   an inverter driving the motor based on a corrected voltage instruction obtained by comparing the voltage instruction and the magnetic pole discrimination reference signal; and
   a processor including a control logic for deriving a response component to the magnetic pole discrimination reference signal from a driving current, which is transferred to the motor from the inverter, wherein the processor determines a polarity of a rotor of the motor based on the response component.

2. The apparatus of claim 1, wherein the current controller receives synchronous-coordinate d-axial and q-axial actual current values that are applied to the motor and synchronous-coordinate d-axial and q-axial current instruction values for driving the motor and outputs synchronous-coordinate d-axial and q-axial voltage instructions for driving the motor.

3. The apparatus of claim 2, wherein the signal generator generates and applies a high-frequency voltage signal to the synchronous-coordinate d-axial and q-axial voltage instructions that are output from the current controller.

4. The apparatus of claim 3, further comprising at least one or more of:
   a first phase converter converting synchronous-coordinate d-axial and q-axial voltages corrected by being combined with a high-frequency voltage signal from the signal generator into stationary-coordinate d-axial and q-axial voltages;
   a current sensor measuring driving currents for phases of the motor using output voltage of the inverter; and
   a second phase converter converting the driving currents for the phases of the motor measured by the current sensor into synchronous-coordinate and stationary-coordinate d-axial and q-axial currents.

5. The apparatus of claim 4, wherein the processor includes:
   a first filter removing a high-frequency component of synchronous-coordinate d-axial current converted by the second phase converter;
   a second filter removing a high-frequency component of synchronous-coordinate q-axial current converted by the second phase converter; and
   a first position estimating logic deriving a position of the rotor based on synchronous-coordinate q-axial current information with the high-frequency component removed by the second filter and magnetic pole component information of the rotor determined by the processor.

6. The apparatus of claim 4, wherein the processor further includes a second position estimating logic for deriving an expanded induced voltage value based on stationary-coordinate d-axial and q-axial current values converted by the second phase converter, and for estimating the position of the rotor on the basis of the derived expanded induced voltage value.

7. The apparatus of claim 6, wherein the processor estimates the position of the rotor through an extended electromotive force (EEMF)-based algorithm.

8. The apparatus of claim 7, wherein position information of the rotor derived through the EEMF-based algorithm includes magnetic pole information of the rotor.

9. The apparatus of claim 8, wherein the processor estimates the position of the rotor based on the magnetic information of the rotor estimated by the second position estimating logic and the synchronous-coordinate q-axial current information with a high-frequency component removed by the second filter.

10. The apparatus of claim 1, wherein the processor includes inductance information corresponding to a position of the rotor.

11. The apparatus of claim 10, wherein the processor determines that the rotor is positioned outside a magnetic pole determination range when the processor cannot determine a magnetic pole of the rotor, and
    wherein the signal generator generates and applies a new magnetic pole discrimination reference signal that is adjusted to a predetermined level when the processor determines that the rotor is positioned outside the magnetic pole determination range.

12. The apparatus of claim 11, wherein the processor determines the magnetic pole of the rotor, when it is determined that the rotor is positioned outside the magnetic pole determination range, by deriving a first slope between first inductance and second inductance and a second slope between the first inductance and third inductance and then comparing the first and second slopes, based on first inductance information corresponding to the position of the rotor and second inductance information and third inductance information corresponding to a first estimation position and a second estimation position, respectively, where the rotor is to be positioned when the new magnetic pole discrimination reference signal is received from the signal generator.

13. The apparatus of claim 12, wherein the processor determines the magnetic pole of the rotor is positioned in the first estimation position when the first slope is greater than the second slope, and determines the magnetic pole of the rotor is positioned in the second estimation position when the second slope is greater than the first slope.

* * * * *